(12) United States Patent
Boylston et al.

(10) Patent No.: US 8,165,759 B2
(45) Date of Patent: Apr. 24, 2012

(54) TILT SENSOR ASSEMBLY AND METHOD

(75) Inventors: Clifford H. Boylston, Conyers, GA (US); Dennis R. Young, Sheffield Village, OH (US); Arthur James Harvey, Mantua, OH (US)

(73) Assignee: Delta Systems, Inc., Streetsboro, OH (US)

( * ) Notice: Subject to any disclaimer, the term of this patent is extended or adjusted under 35 U.S.C. 154(b) by 587 days.

(21) Appl. No.: 12/261,291

(22) Filed: Oct. 30, 2008

(65) Prior Publication Data
US 2010/0114435 A1 May 6, 2010

(51) Int. Cl.
B60R 22/00 (2006.01)
(52) U.S. Cl. .......................................... 701/45
(58) Field of Classification Search .................. 280/755; 56/10.2 D, 10.2 E, 10.2 F, 10.2 R; 172/4, 172/4.5; 340/689; 701/45
See application file for complete search history.

(56) References Cited

U.S. PATENT DOCUMENTS

| 3,702,051 | A | 11/1972 | Deines |
| 5,532,672 | A | 7/1996 | Plazarin |
| 5,742,228 | A | 4/1998 | Levy |
| 5,797,111 | A | 8/1998 | Halasz et al. |
| 6,983,583 | B2 * | 1/2006 | Bucher ...................... 56/10.2 R |
| 7,373,801 | B2 * | 5/2008 | Friedman et al. ............ 73/12.06 |
| 7,641,234 | B1 | 1/2010 | Pelnar |
| 7,950,268 | B2 * | 5/2011 | Friedman et al. ............ 73/12.06 |
| 2003/0102178 | A1 | 6/2003 | Ide et al. |
| 2005/0004730 | A1 | 1/2005 | Suzuki et al. |
| 2005/0080544 | A1 | 4/2005 | Suzuki et al. |
| 2005/0108999 | A1 * | 5/2005 | Bucher ...................... 56/10.2 R |
| 2005/0217230 | A1 * | 10/2005 | Bucher ...................... 56/10.2 R |
| 2010/0191408 | A1 * | 7/2010 | Boylston et al. ................ 701/29 |
| 2011/0265341 | A1 | 11/2011 | Young |

FOREIGN PATENT DOCUMENTS

JP 2005205960 A 8/2005

OTHER PUBLICATIONS

Powers et al., "Preventing tractor rollover fatalities: performance of the NIOSH AutoROPS", Injury Prevention, 7 (Suppl I): i-54-58 (2001).

International Search Report (14 pages) for App. EP10150894, mailing date Jun. 30, 2010.

* cited by examiner

Primary Examiner — Faye M. Fleming
(74) Attorney, Agent, or Firm — Tarolli, Sundheim Covell & Tummino LLP

(57) ABSTRACT

A tilt sensor arrangement and method that allows a tilt angle sensor of a vehicle to be tested without tilting the vehicle. In one embodiment, a tilt angle sensor of a vehicle is tested when the vehicle is positioned in a generally horizontal position. The tilt angle sensor is rotated from an operating position to a test position while the vehicle remains in the generally horizontal position and the tilt angle sensor is tested.

40 Claims, 12 Drawing Sheets

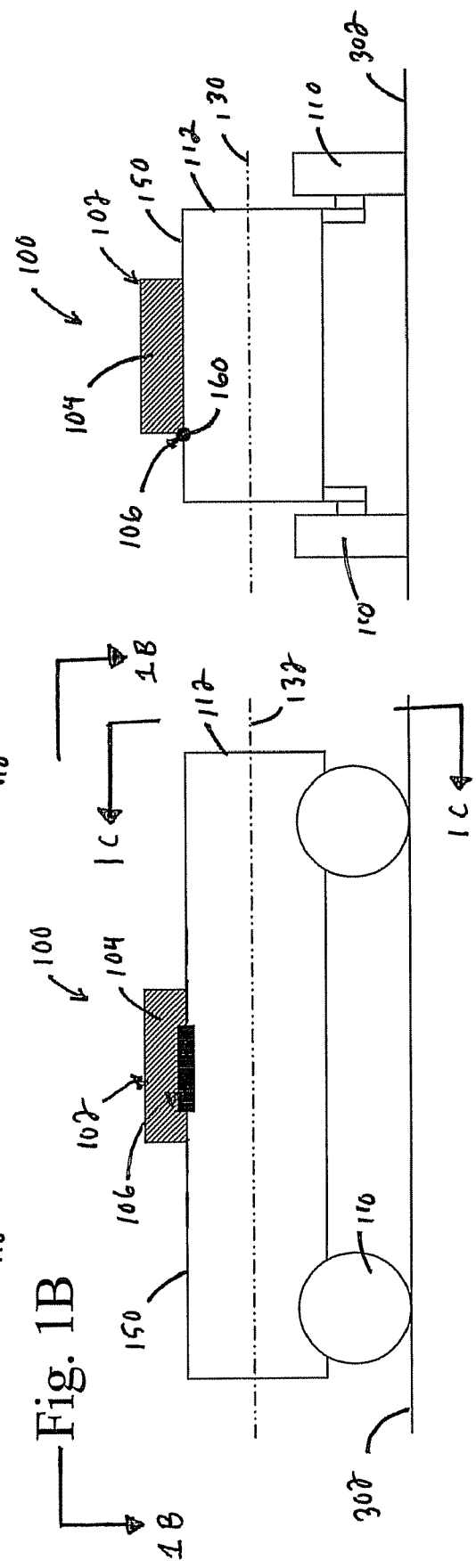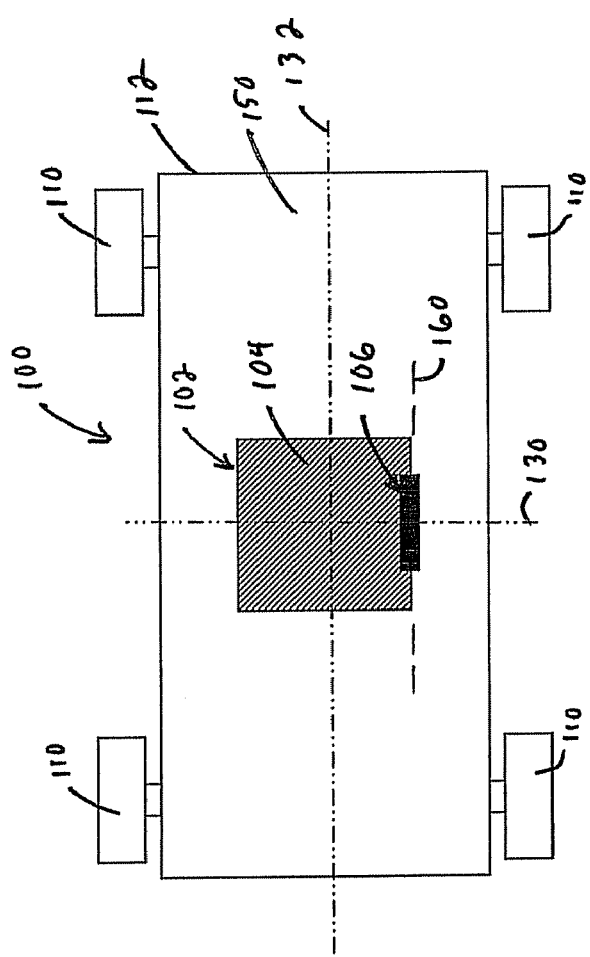

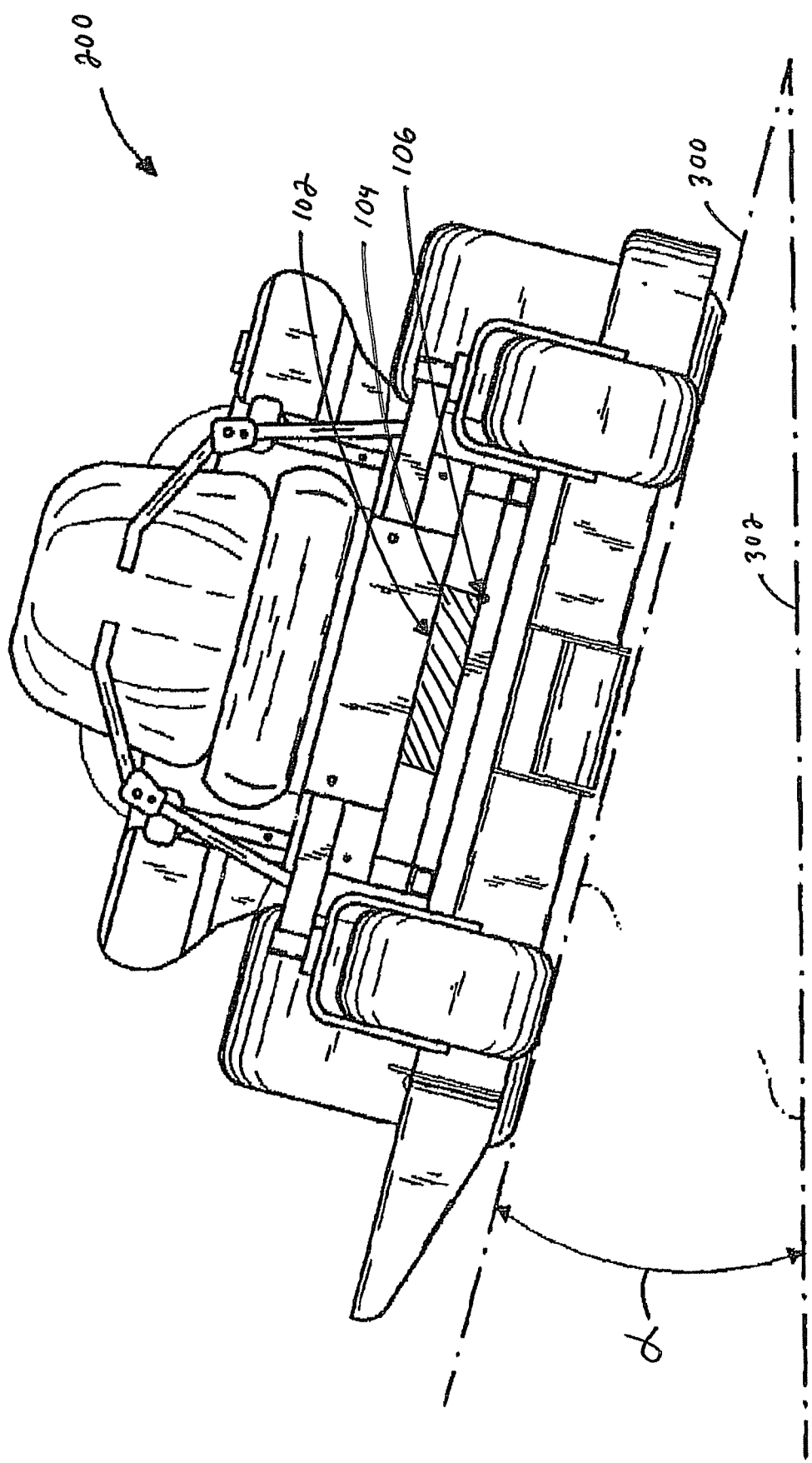

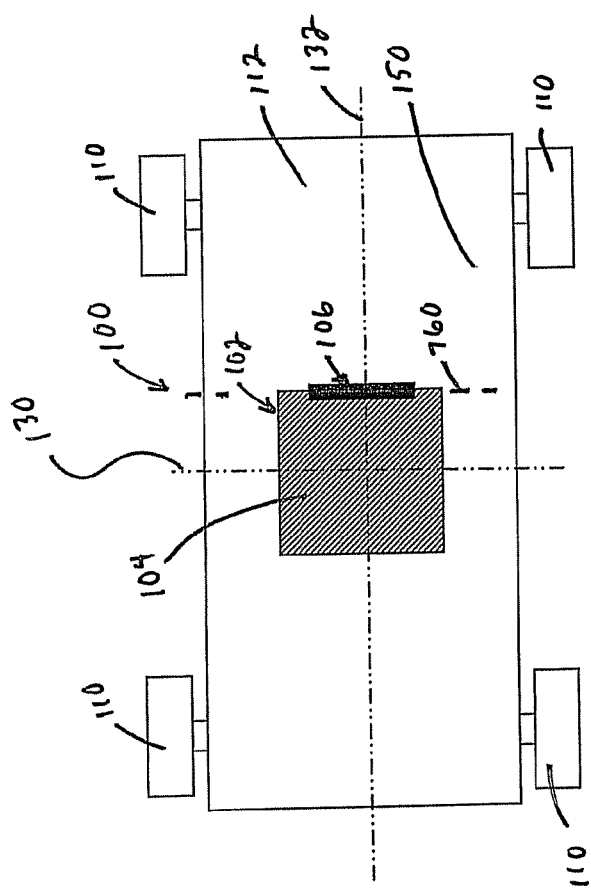
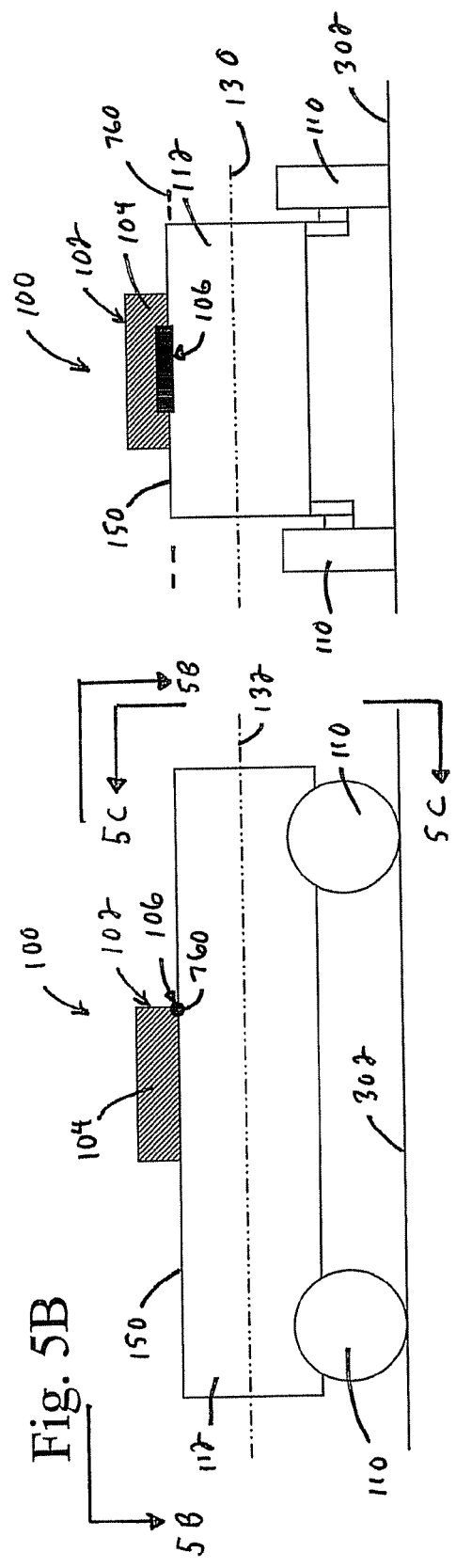
Fig. 5C
Fig. 5B
Fig. 5A

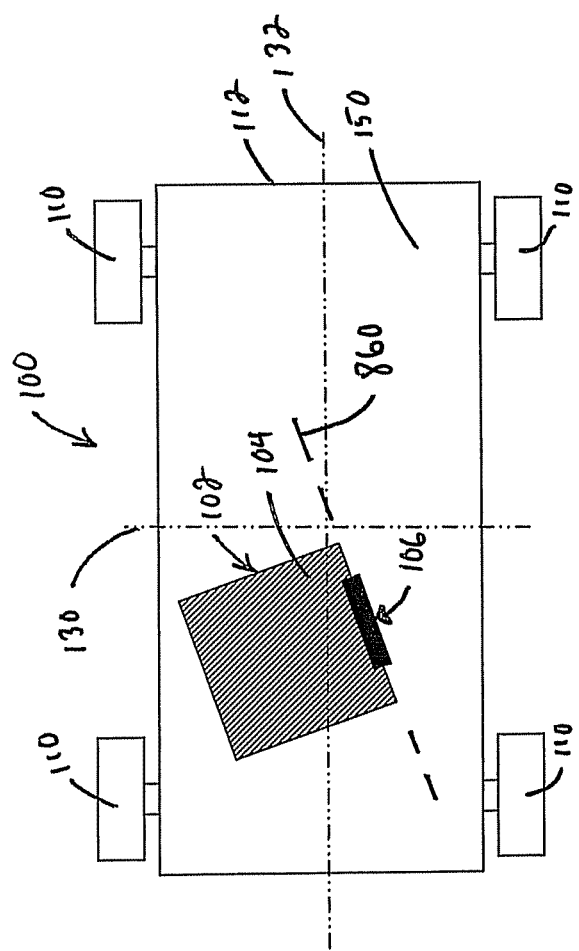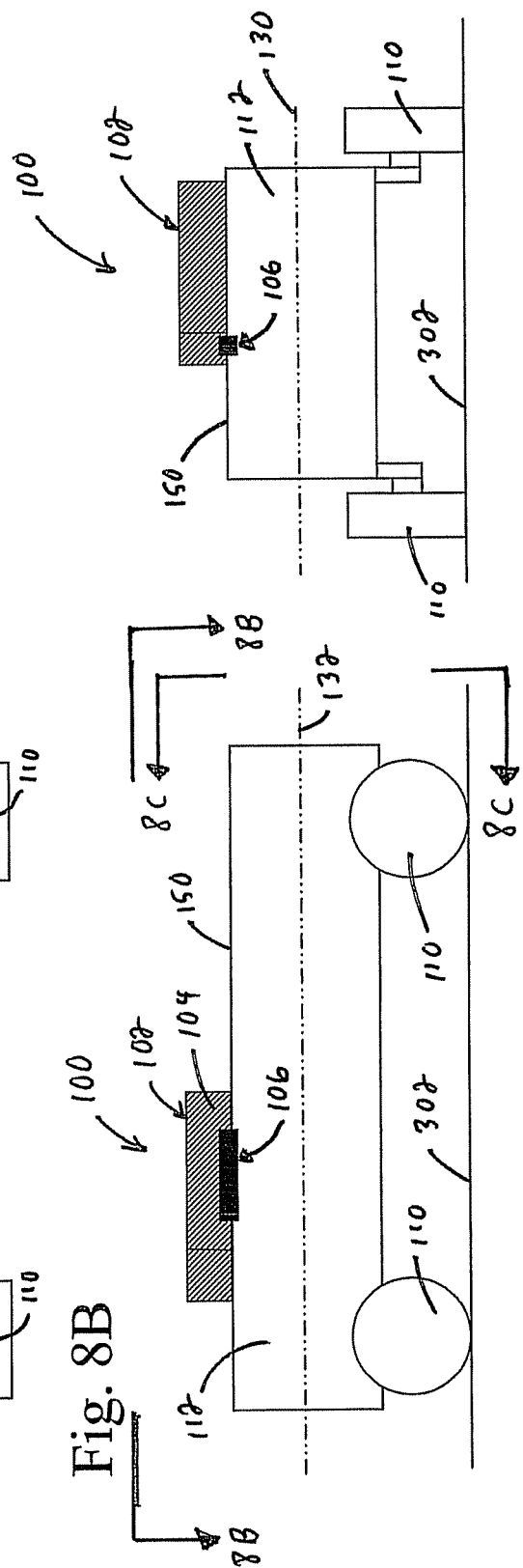
Fig. 8A
Fig. 8B
Fig. 8C

TILT SENSOR ASSEMBLY AND METHOD

FIELD OF THE INVENTION

The present application relates to a tilt sensor assembly and method, and more particularly to a tilt sensor assembly and method that allows a tilt sensor of a vehicle to be tested without tilting the vehicle.

BACKGROUND OF THE INVENTION

Many vehicles include powered implements for performing a variety of different tasks. Vehicles with powered implements include tractors, lawn mowers, trimmers, soil tillers, snow throwers and the like. Many vehicles with powered implements are self propelled and an operator may ride on the vehicle. Vehicles with powered implements tilt as they travel over sloped surfaces, such as hills. The sloped surface that a vehicle with a powered implement travels over are often steeper than the sloped surface that automobiles travel over, since many surfaces that vehicles with powered implements are used on are not graded or paved for automobiles.

If a vehicle with a powered implement tilts too much, the vehicle could potentially tip over. Vehicles with powered implements have been equipped with tilt sensors to provide the driver with an indication that the vehicle is approaching a tilt limit and to disable the powered implement. U.S. Pat. No. 6,983,583 to Bucher discloses a lawnmower with tilt sensors. U.S. Pat. No. 6,983,583 is incorporated herein by reference in its entirety.

SUMMARY

The present application discloses a tilt sensor arrangement and method that allows a tilt angle sensor of a vehicle to be tested without tilting the vehicle. In one embodiment, a tilt angle sensor of a vehicle is tested when the vehicle is positioned in a generally horizontal position. The tilt angle sensor is rotated from an operating position to a test position while the vehicle remains in the generally horizontal position and the tilt angle sensor is tested.

In one exemplary embodiment, a tilt sensor arrangement includes a base member and a tilt angle sensor. The base member is configured for fixed attachment to the vehicle The tilt angle sensor is coupled to the base member such that the tilt angle sensor is rotatable with respect to the base unit from an operating position to a test position.

BRIEF DESCRIPTION OF THE DRAWINGS

These and other inventive aspects and features of the present disclosure will become apparent to one skilled in the art to which the present invention relates upon consideration of the following description of the exemplary embodiments with reference to the accompanying drawings, in which:

FIG. 1A is a schematic side elevation view of a vehicle with a tilt sensor assembly;

FIG. 1B is a view taken along lines 1B-1B in FIG. 1A;

FIG. 1C is a view taken along lines 1C-1C in FIG. 1A;

FIG. 3B is a view of the lawnmower with tilt sensor assembly of FIG. 2 positioned on an inclined surface;

FIG. 5A is a schematic side elevation view of another embodiment a vehicle with a tilt sensor assembly;

FIG. 5B is a view taken along lines 5B-5B in FIG. 5A;

FIG. 5C is a view taken along lines 5C-5C in FIG. 5A;

FIG. 8A is a schematic side elevation view of another embodiment a vehicle with a tilt sensor assembly;

FIG. 8B is a view taken along lines 8B-8B in FIG. 8A;

FIG. 8C is a view taken along lines 8C-8C in FIG. 8A;

DETAILED DESCRIPTION

While the inventions are described herein with specific reference to a variety of exemplary structural and material features, such descriptions are intended to be exemplary in nature and should not be construed in a limiting sense. Further, while various aspects of the invention are described and illustrated herein as embodied in combination in the exemplary embodiments, these various aspects may be realized in many alternative embodiments, either individually or in various combinations and sub-combinations thereof. Unless expressly excluded herein all such combinations and sub-combinations are intended to be within the scope of the present invention. Still further, while various alternative embodiments as to the various aspects and features of the invention, such as alternative materials, structures, configurations, methods, devices, software, hardware, control logic and so on may be described herein, such descriptions are not intended to be a complete or exhaustive list of available alternative embodiments, whether presently known or later developed. Those skilled in the art may readily adopt one or more of the aspects, concepts or features of the invention into additional embodiments within the scope of the present invention even if such embodiments are not expressly disclosed herein. Additionally, even though some features, concepts or aspects of the invention may be described herein as being a preferred arrangement or method, such description is not intended to suggest that such feature is required or necessary unless expressly so stated. Still further, exemplary or representative values and ranges may be included to assist in understanding the present invention however, such values and ranges are not to be construed in a limiting sense and are intended to be critical values or ranges only if so expressly stated.

Figure 4A:
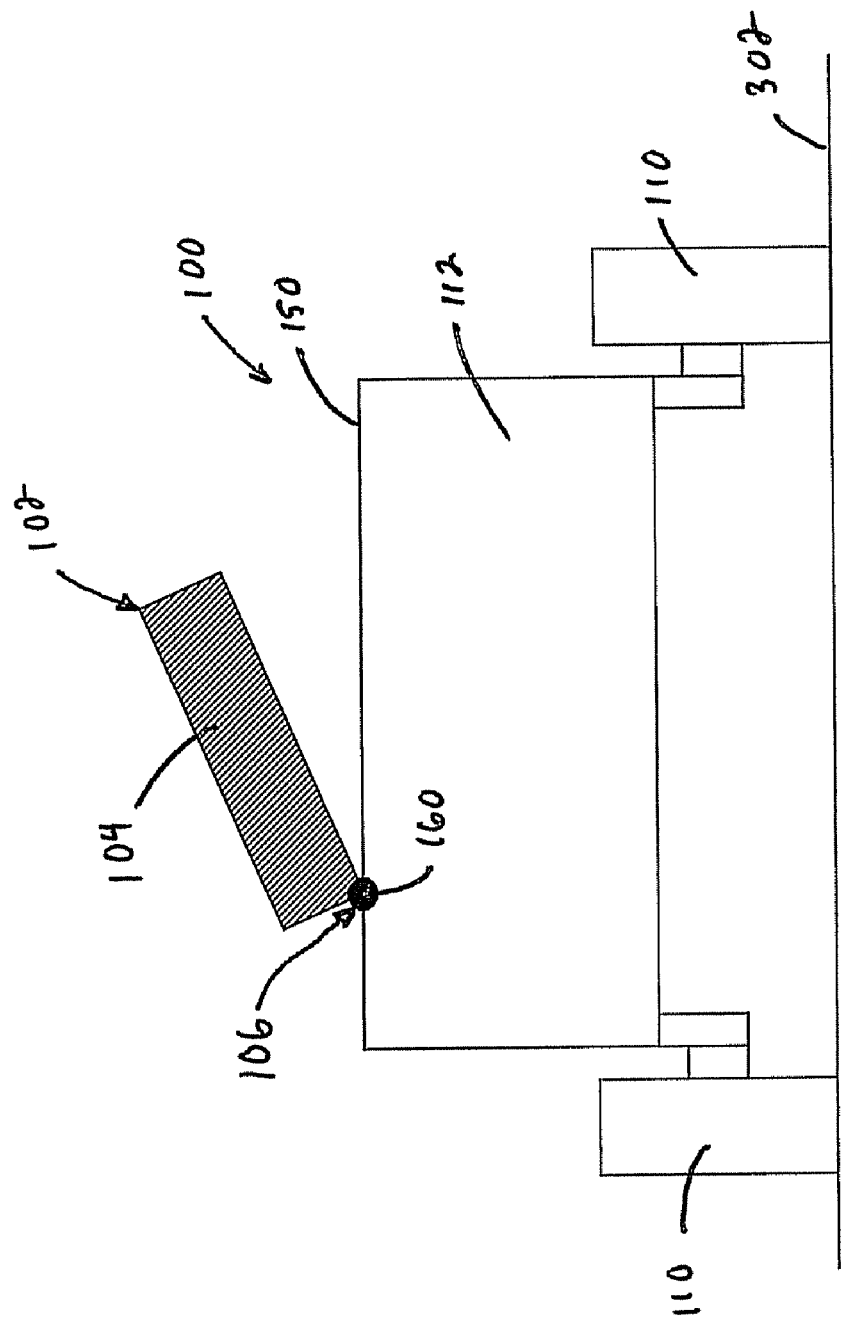
FIG. 4A is a view of the vehicle with tilt sensing arrangement of FIGS. 1A-1C positioned on a horizontal surface with a tilt sensor rotated to a test position.

FIGS. 1A-1C illustrate an embodiment of a vehicle 100 that includes a tilt sensor assembly 102. The tilt sensor assembly 102 includes a tilt sensor 104 and a coupling 106 that allows the tilt sensor 104 to be tested without tilting the vehicle 100 and without disassembling the tilt sensor arrangement 102 from the vehicle. Referring to FIG. 4A, as is described in more detail below, the tilt sensor 104 can be tested without tilting the vehicle 100, because the coupling 106 allows the tilt sensor 104 to be tilted with respect to the vehicle 100.

The coupling 106 can take a wide variety of different forms. For example, the coupling 106 may be any arrangement that allows the tilt sensor 104 to be rotated or moved away from a surface 150 of the vehicle 100 that supports the tilt sensor arrangement. Examples of suitable couplings 106 include, but are not limited to hinges, linkages, gimbals, flexible or resilient beams, flexible or resilient straps, and the like. In an exemplary embodiment, the coupling 106 connects the sensor 104 to the vehicle 100 and allows the sensor to be moved between an operating position (FIGS. 1A-1C) and a test position (FIG. 4A). In the operating position, the tilt angle sensor 104 may sense a tilt angle of the vehicle and in the test position the tilt angle sensor may be tested to verify that the tilt angle sensor is working properly as will be described in more detail below.

The vehicle 100 illustrated by FIGS. 1A-1C is generic, since the tilt sensor arrangement 102 can be implemented on a wide variety of different types of vehicles. The vehicle illustrated by FIGS. 1A-1C includes wheels 110 and a frame or body 112. The tilt sensor arrangement 102 is particularly useful on vehicles that include powered implements for performing a variety of different tasks, such as landscaping and construction tasks. Vehicles with powered implements that may benefit from the tilt sensor arrangement 102 include, but are not limited to tractors, lawnmowers, trimmers, soil tillers, snow throwers and the like. The tilt sensor arrangement may be used on any landscaping or construction vehicle that is self propelled and that an operator rides upon and may be especially beneficial for such vehicles that do not include an enclosed cabin.

Figure 2:
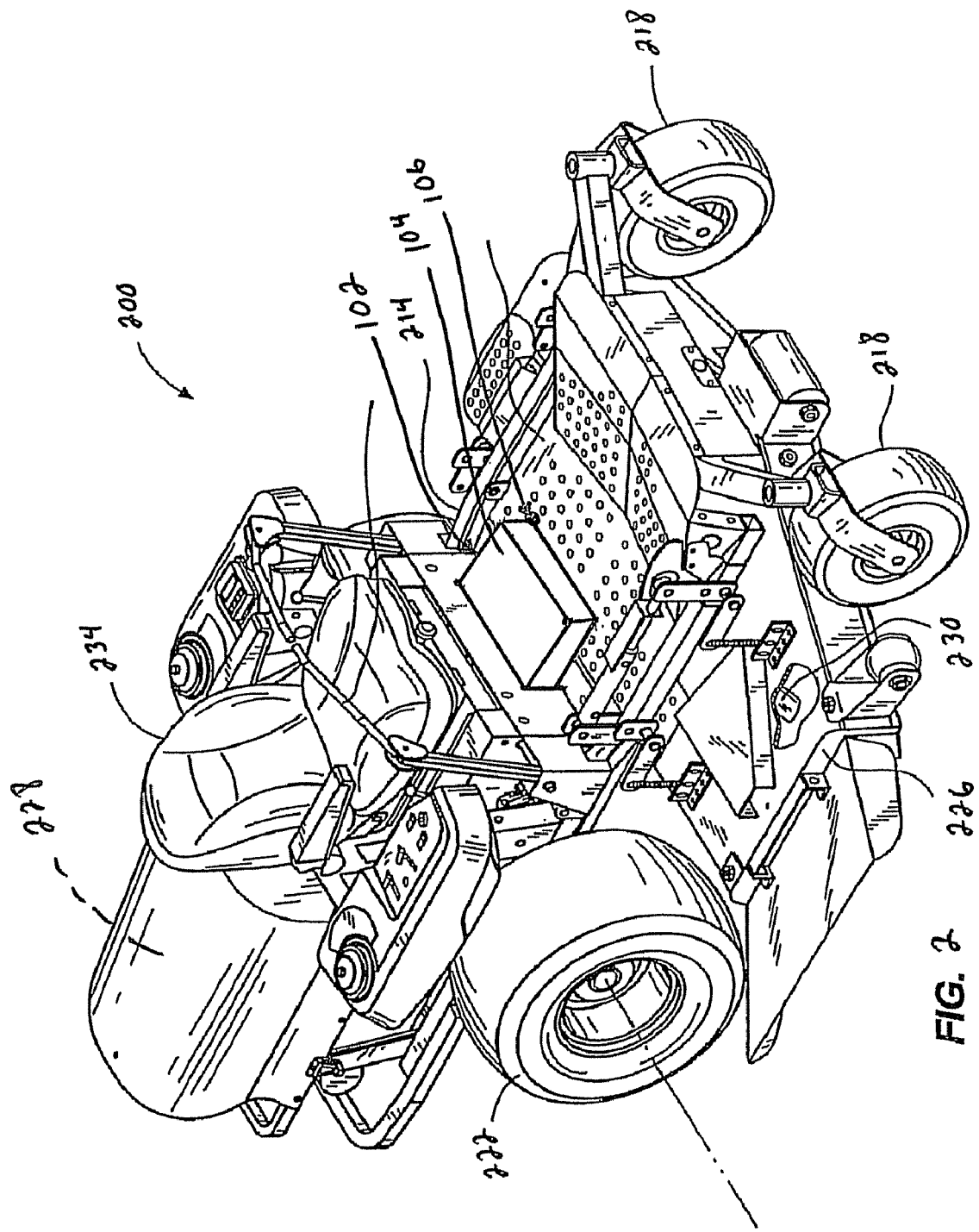
FIG. 2 is a perspective view of a lawnmower with a tilt sensor assembly.

FIG. 2 illustrates an example of a vehicle with a tilt sensor arrangement 102. In the example illustrated by FIG. 2, the vehicle is a lawnmower 200. The lawnmower 200 includes a frame 214. Front wheels 218 and rear wheels 222 support the frame 214. The rear wheels 222 are driven by an engine 228 to move the lawnmower. A mower deck 226 is suspended from the frame. A cutting blade 230 is disposed under the mower deck 226 and is driven by the engine 228. A seat 234 is supported by the frame 214.

Figure 3A:
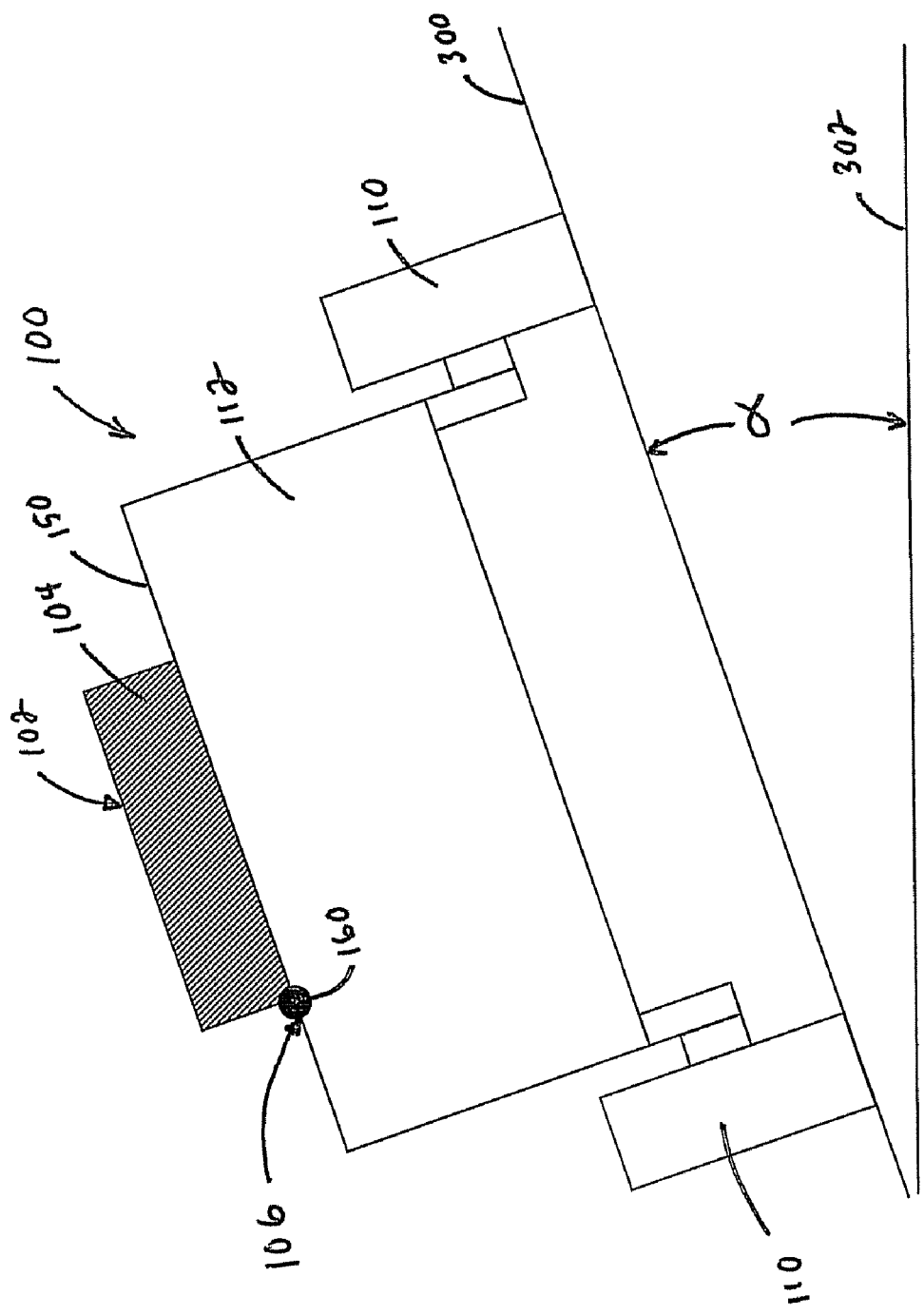
FIG. 3A is a view of the vehicle with tilt sensor assembly of FIGS. 1A-1C positioned on an inclined surface.

The vehicle 100 illustrated by FIGS. 1A-1C and the lawnmower 200 illustrated by FIG. 2 may be driven on an off-road surface. The vehicle 100 and lawnmower 200 may encounter uneven terrain and may be operated on a hill or slope. FIG. 3A illustrates the vehicle 100 positioned on a slope 300 being tilted from a horizontal plane 302. FIG. 4A illustrates the lawnmower 200 positioned on the slope 300 being tilted from the horizontal plane 302. The position of the vehicle 100 or lawnmower 200 on the slope 300 defines a tilt angle α that represents the orientation of the vehicle 100 or lawnmower 200 with respect to the horizontal plane 302. The tilt angle α is generally zero when the vehicle 100 or lawnmower 200 is on a flat, level, horizontal surface. (See FIGS. 4A and 4B) The tilt angle α increases when the vehicle 100 or lawnmower is operated on a slope or traverses uneven terrain. (See FIGS. 3A and 3B).

The tilt sensor 104 senses the tilt angle α and provides an output that helps to reduce the likelihood that an operator of the vehicle 100 or lawnmower 200 will unknowingly encounter an unsafe condition. The output of the sensor 104 can be used in a wide variety of different ways. For example, the output of the sensor 104 can be used to provide an indication to the operator that the tilt angle α has reached a predetermined tilt angle. For example, the predetermined tilt angle may correspond to the maximum slope recommended by the manufacturer of the vehicle 100 or lawnmower 200 or the maximum recommended slope reduced by a factor of safety. For example, the predetermined tilt angle may be ten degrees, fifteen degrees, twenty degrees, twenty-five degrees, thirty degrees, or between ten degrees and thirty degrees. However, the predetermined tilt angle may be any tilt angle that is suitable for the particular vehicle that the tilt sensor is used on.

The output of the sensor 104 may be used to provide more than one indication of the tilt angle α to the operator. For example, a first indication or check indicator may be provided to the operator when the value of the tilt angle α reaches a first predetermined tilt angle and a second indication or limit indicator may be provided to the operator when the value of the tilt angle α reaches a second predetermined tilt angle. The first predetermined tilt angle may be an arbitrary angle that is selected by the manufacturer to provide the operator with an indication that the vehicle has encountered a significant slope. The second predetermined tilt angle may be an angle selected by the manufacturer to provide the operator with an indication that if the tilt angle continues to increase, an unsafe condition will result. For example, the first predetermined tilt angle may be ten degrees, fifteen degrees, or between ten degrees and fifteen degrees and the second predetermined tilt angle may be twenty degrees, twenty-five degrees, or between twenty and twenty-five degrees.

In another embodiment, the output of the sensor 104 may be used to drive a gauge that provides a reading of the tilt angle α to the operator. A secondary indicator may also be included that provides an indication to the operator that an unsafe condition is being approached in addition to the gauge. The output of the sensor may drive any number of indicators and gauges and any number of sensors may be included. The indicators and gauges may be visual, audible, and/or tactile.

The output of the sensor 104 can also be used to make the vehicle safer when the tilt angle α has reached a predetermined tilt angle. Any safety precaution may be taken when the tilt angle α reaches or exceeds the predetermined tilt angle. For example, a powered implement 120 of the vehicle 100 or the cutting blade 230 of the mower may be disabled and/or braked when the value of the output of the sensor 104 indicates that the tilt angle α has reached or exceeded the predetermined tilt value. Similarly, an operator restraint system, such as a seat belt slack adjuster, may be activated, a roll bar may move to or lock in a protective position, such as movement of a roll bar from a lowered position to an upright, protective position, and/or an anti-roll system that reduces the likelihood that the vehicle 100 or lawnmower 200 will tip over may be activated when the tilt angle α reaches or exceeds the predetermined tilt angle. One or more of these safety precautions may be taken in addition to providing the operator with an indicator, one or more of these safety precautions may be taken without providing the operator with an indicator, or the operator may be provided with an indicator without taking further safety precautions.

A wide variety of different tilt sensors 104 may be used. Any sensor capable of detecting the tilt angle α may be used and any sensor capable of detecting that the tilt angle α exceeds a predetermined angle may be used. Examples of tilt angle sensors 104 that can detect the tilt angle α include, but are not limited to inclinometers and accelerometers. An example of a sensor 104 that can detect that the tilt angle α has reached or exceeded a predetermined angle is a tip switch. Details of suitable inclinometers and tip switches are disclosed in U.S. Pat. No. 6,983,583, issued on Jan. 10, 2006 to Bucher. U.S. Pat. No. 6,983,583 is incorporated herein by reference in its entirety. One acceptable accelerometer that may be used to calculate a tilt angle is a Freescale™ Semiconductor MMA 7361.

The tilt sensor may sense the pitch of the vehicle 100 or lawnmower 200 (i.e. the rotation of the vehicle 100 or lawnmower 200 about an axis 130), the roll of the vehicle 100 or lawnmower 200 (i.e. the rotation of the vehicle 100 or lawnmower 200 about an axis 132), or both. When both the pitch and roll are sensed, the overall tilt angle of the vehicle 100 or lawnmower 200 can be determined. Predetermined tilt angles that determine when an indication will be provided to the operator and/or when a safety measure will be taken can be set for pitch, roll, and/or overall tilt angle.

In an exemplary embodiment, before a vehicle 100 or lawnmower 200 is sold to a customer or returned to a customer after servicing a system of the vehicle 100 or lawnmower 200, the tilt sensor 104 installed on the vehicle 100 or lawnmower 200 and systems driven or controlled based on the output of the tilt sensor are tested to make sure they function properly. In this application, "testing of the tilt sensor" refers to any testing of the tilt sensor itself, as well as testing of systems that utilize or are driven or controlled based on an output of the tilt sensor. For example, the tilt sensor 104 may be tested to ensure that the tilt sensor provides the appropriate output(s) when the tilt sensor is tilted to one or more predetermined angles, a display or notification system may be tested to make sure an appropriate indicator is provided to the operator when the vehicle is tilted to a predetermined angle, and/or a safety system may be tested to ensure that an appropriate safety measure occurs when the vehicle is tilted to a predetermined angle. These angles may be the same or multiple tilt angles may need to be tested. In one embodiment, the tilt angle sensor is tested by determining a value of an output signal of the tilt angle sensor while the tilt angle sensor is in the test position and comparing the value of the output signal to a predetermined test position value.

FIGS. 3A and 3B illustrate one manner in which the tilt sensor 104 and/or systems driven by or controlled based on the output of the tilt sensor can be tested. The vehicle 100 or lawnmower 200 is moved onto an inclined surface 300 or onto a table or platform that is capable of tilting the vehicle 100 or lawnmower 200 and the tilt sensor 104 and/or systems driven by or controlled based on the output of the tilt sensor are tested.

Figure 4B:
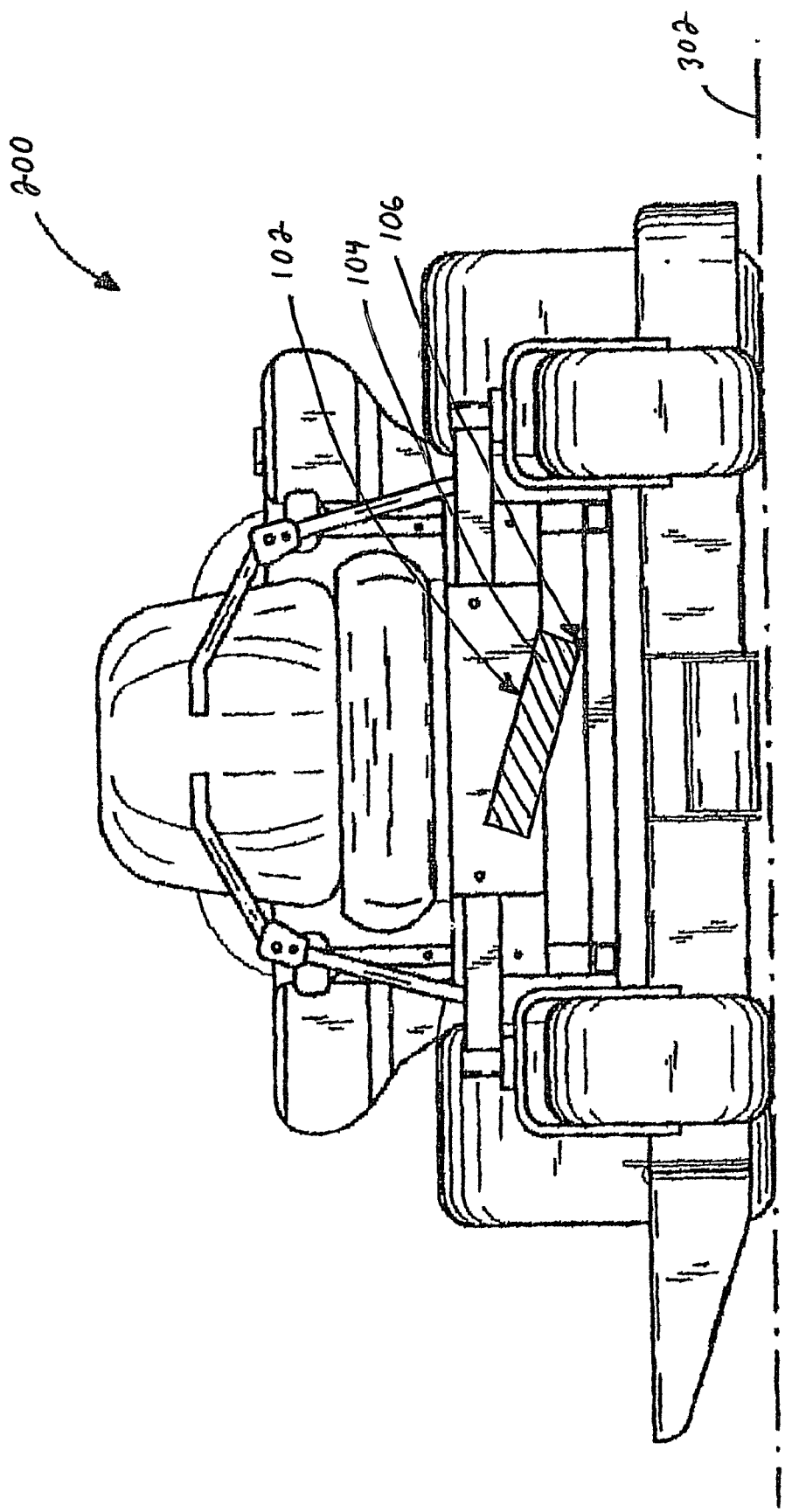
FIG. 4B is a view of the lawnmower of FIG. 2 positioned on a horizontal surface with a tilt sensor rotated to a test position.

FIGS. 4A and 4B illustrate how the tilt sensor arrangement 102 allows the tilt sensor 104 and/or systems driven by or controlled based on the output of the tilt sensor to be tested, without tilting the vehicle 100 or lawnmower 200. The vehicle 100 or lawnmower 200 is positioned in a generally horizontal orientation. In an exemplary embodiment, the vehicle 100 or lawnmower 200 is simply placed on a flat, level horizontal surface 302 to test the sensor 104. The coupling 106 allows the sensor 104 to be rotated from an operating position (See FIGS. 1A-1C) to a test position (See FIG. 4A) while the vehicle 100 or lawnmower 200 remains in the generally horizontal position. The tilt sensor 104 and/or systems driven by or controlled based on the output of the tilt sensor are then tested. Once the tilt sensor 104 and/or systems driven by or controlled based on the output sensor are tested, the sensor may be returned to the operating position. In the operating position, the sensor 104 senses the tilt angle of the vehicle 100 or lawnmower 200.

The coupling 106 may position the tilt sensor in a variety of different positions. In the embodiment illustrated by FIGS. 1A-C and 4A, the coupling is configured to pivot the tilt angle sensor 104 about a pivot axis 160 from the operating position to the test position. The pivot axis 160 may be generally parallel to the support surface 150 of the vehicle 100 that the coupling is attached to. In the example illustrated by FIGS. 1A-C and 4A, the pivot axis is parallel to the roll axis 132. As a result, pivoting of the tilt angle sensor 104 about the pivot axis 160 by a predetermined angle to a test position will cause the tilt angle sensor 104 to provide the same or substantially the same output as would be provided when the vehicle is rotated the same predetermined angle with respect to the roll axis and the tilt angle sensor is in the operating position (see FIG. 3A). This mounting configuration allows the tilt angle sensor to be tested for roll angles without rotating the vehicle about the roll axis 132 and allows the tilt angle sensor to be tested for overall tilt angles without tilting the vehicle.

Figure 6:
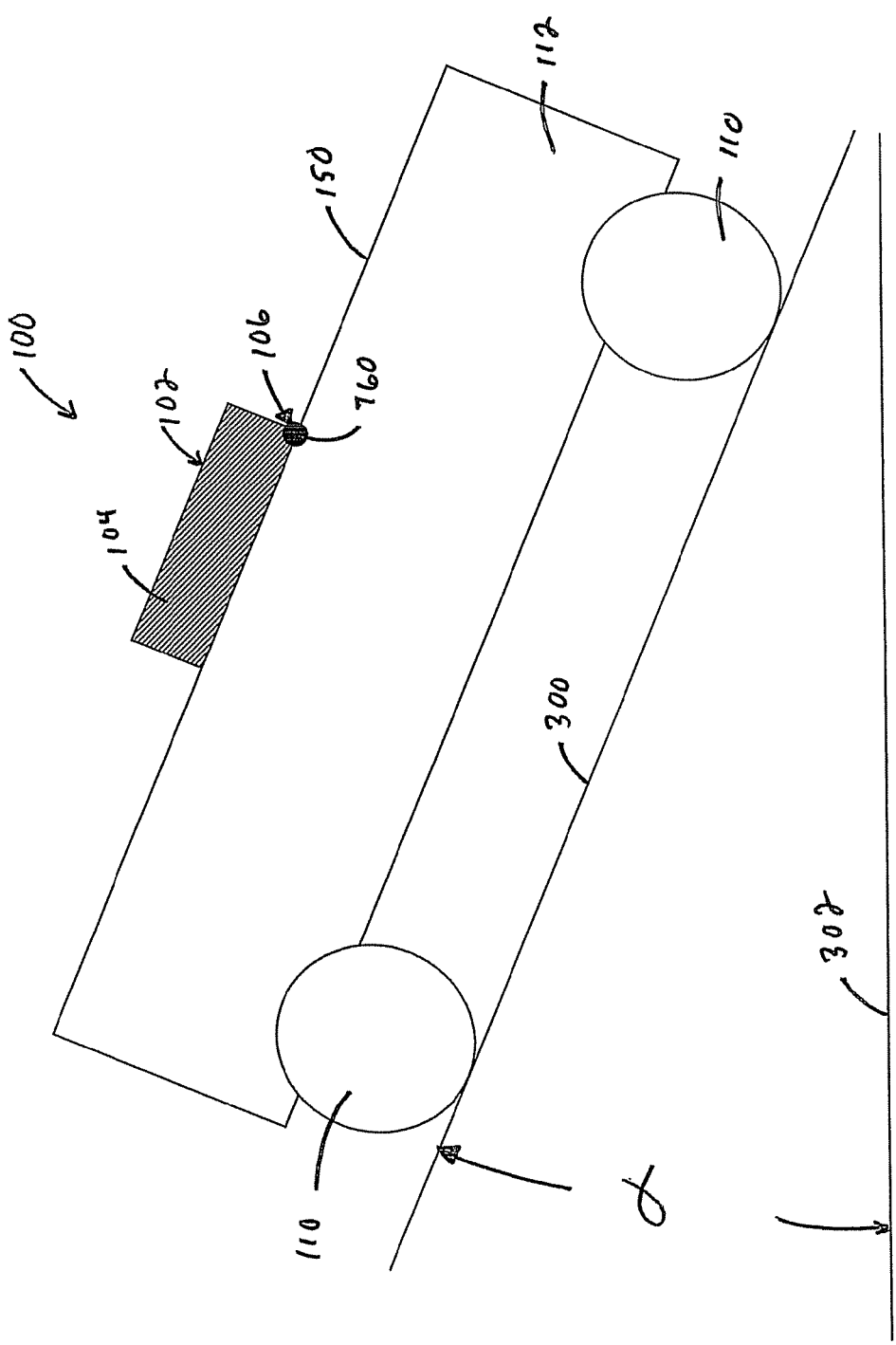
FIG. 6 is a view of the vehicle with tilt sensor assembly of FIGS. 5A-5C positioned on an inclined surface.
Figure 7:
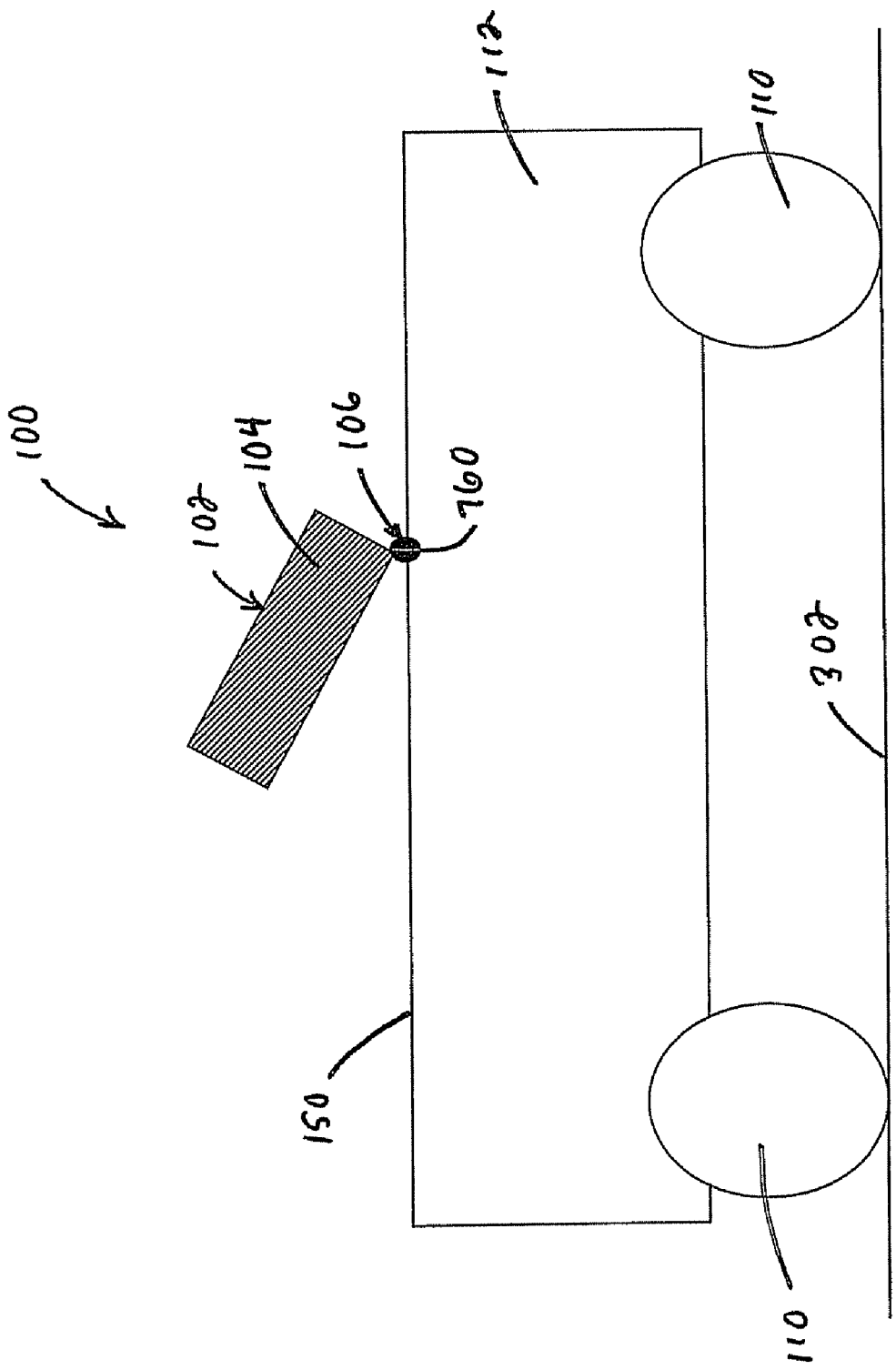
FIG. 7 is a view of the vehicle with tilt sensor assembly of FIGS. 5A-5C positioned on a horizontal surface with a tilt sensor rotated to a test position.

In the embodiment illustrated by FIGS. 5A-C and 7, the coupling is configured to pivot the tilt angle sensor 104 about a pivot axis 760 from the operating position to the test position. The pivot axis 760 may be generally parallel to a support surface 162 of the vehicle 100 that the coupling 106 is attached to. In the example illustrated by FIGS. 5A-C and 7, the pivot axis is parallel to the pitch axis 130. As a result, pivoting of the tilt angle sensor 104 about the pivot axis 760 by a predetermined angle to a test position will cause the tilt angle sensor 104 to provide the same output or substantially the same output as would be provided when the vehicle is rotated the same predetermined angle with respect to the pitch axis and the tilt angle sensor is in the operating position (see FIG. 6). This mounting configuration allows the tilt angle sensor to be tested for pitch angles without rotating the vehicle about the pitch axis 130 and allows the tilt angle sensor to be tested for overall tilt angles without tilting the vehicle.

In the embodiment illustrated by FIGS. 8A-C, the coupling is configured to pivot the tilt angle sensor 104 about a pivot axis 860 from the operating position to the test position. The pivot axis 860 may be generally parallel to a support surface 162 of the vehicle 100 that the coupling 106 is attached to. In the example illustrated by FIGS. 5A-C and 7, the pivot axis is not parallel to the roll axis 132 or the pitch axis 130. This mounting configuration allows the tilt angle sensor to be tested for overall tilt angles without tilting the vehicle.

Figure 9B:
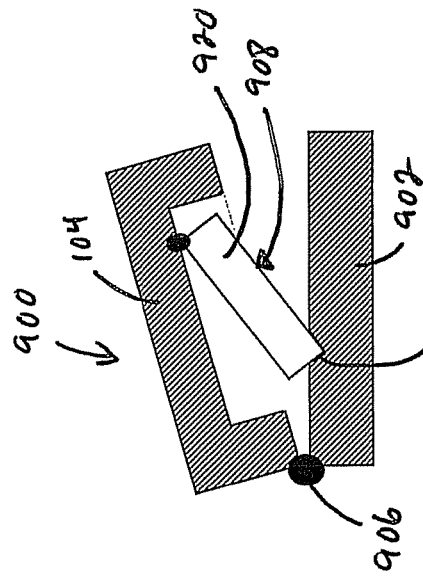
FIG. 9B shows the tilt sensor arrangement of FIG. 9A in a test position.
Figure 9A:
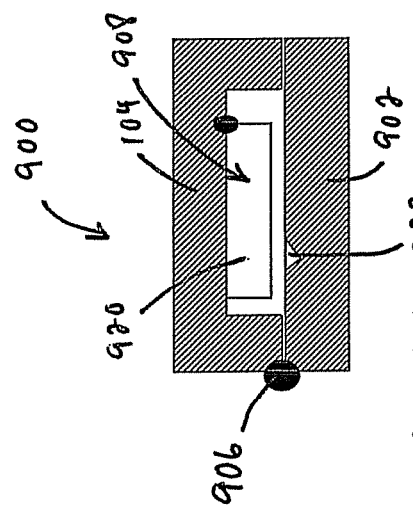
FIG. 9A is a schematic side elevation view of a tilt sensor assembly in an operating position.

FIGS. 9A and 9B illustrate an exemplary embodiment of a tilt angle sensor assembly 900 for measuring a tilt angle of a vehicle. The tilt angle sensor assembly 900 includes a base member 902 configured for fixed attachment to the vehicle. For example, the base member 902 may be configured to attach the tilt angle sensor assembly to a vehicle in any of the orientations described above. A tilt sensor 104 is coupled to the base member 902 such that the tilt sensor 104 is rotatable with respect to the base member from an operating position (FIG. 9A) to a test position (FIG. 9B). For example, the tilt sensor 104 may be coupled to the base member 902 by a hinged connection 906. A positioning arrangement 908 is included for positioning the tilt sensor 104 at one or more predetermined test positions. The positioning arrangement 908 can take a wide variety of different forms. Any arrangement capable of positioning the tilt sensor 104 at one or more predetermined angles with respect to the base member 902 can be used. In the example illustrated by FIGS. 9A and 9B. the positioning arrangement 908 comprises a leg 920 that may be pivotally connected to the tilt angle sensor 104 or the base member 902. The positioning arrangement also includes a detent 922. The leg 920 engages the detent 922 to position the tilt angle sensor in the test position (see FIG. 9B). The leg 920 remains connected to the tilt angle sensor 104 or base member 902 when the tilt angle sensor is in the operating position (see FIG. 9A).

Figure 10B:
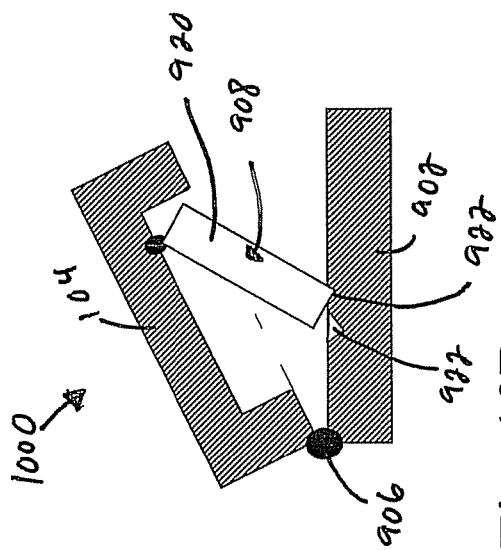
FIG. 10B shows the tilt sensor arrangement of FIG. 10A in a second test position.
Figure 10A:
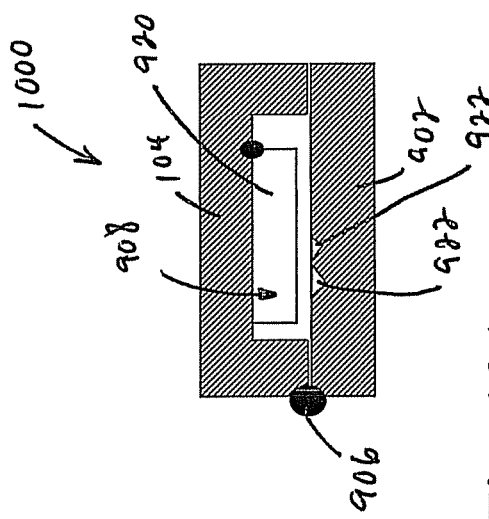
FIG. 10A is a schematic side elevation view of a tilt sensor assembly in an operating position.

FIGS. 10A and 10B illustrate an embodiment of a tilt angle sensor assembly 1000 that is configured to support the tilt angle sensor 104 at multiple test positions. FIGS. 10A and 10B show a tilt angle sensor assembly where the tilt angle sensor can be positioned at two test positions, but the assembly can be configured to define any number of positions. The tilt angle sensor assembly 1000 is substantially the same as the assembly 900, except an additional detent 902 is included in the base member or the sensor 104. The leg 908 can support the tilt angle sensor 104 at the first test position (see FIG. 9B) and at a second test position (see FIG. 10B).

Figure 11:
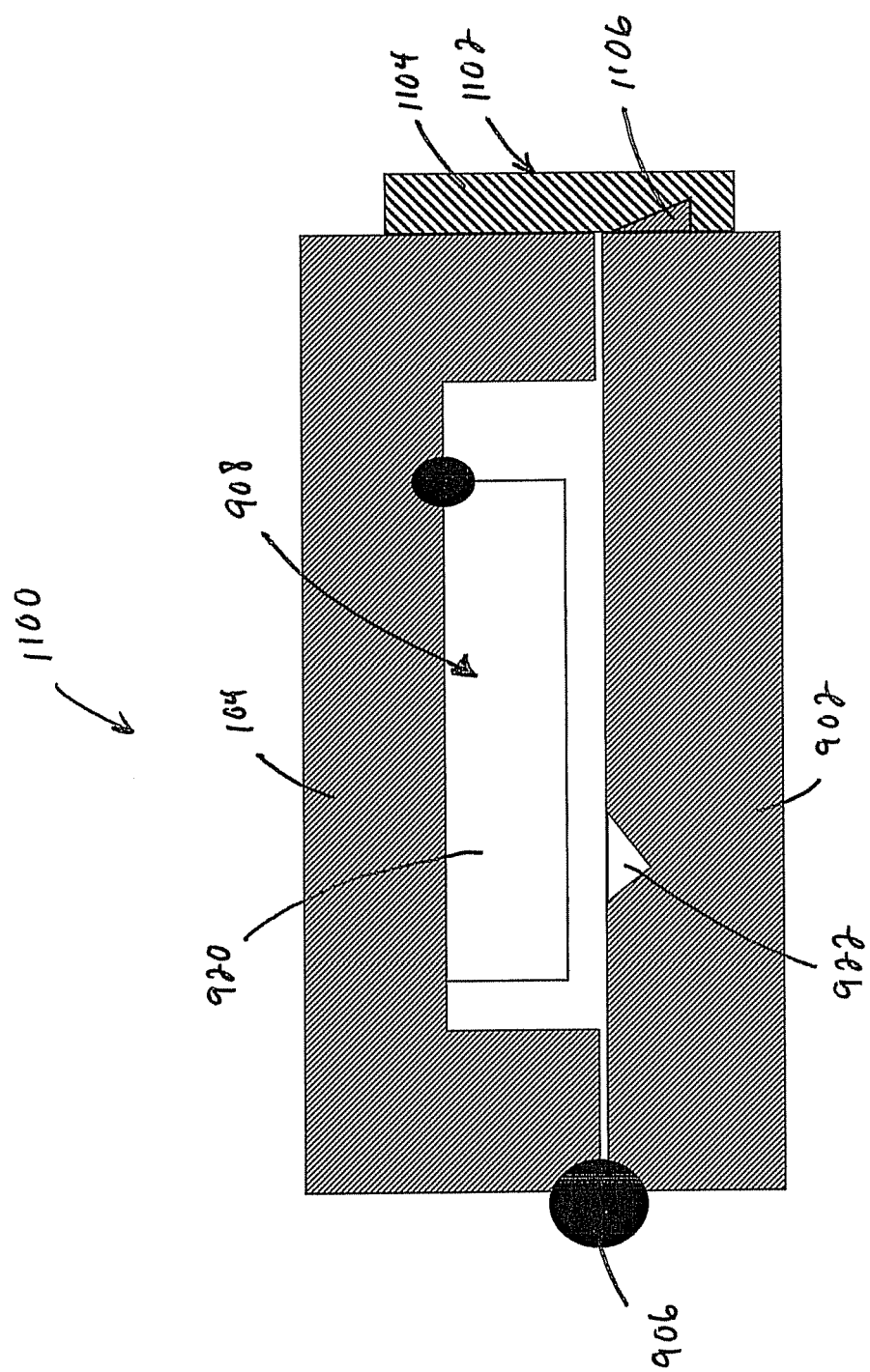
FIG. 11 is a schematic side elevation view of a tilt sensor assembly latched in an operating position.

FIG. 11 illustrates an embodiment of a tilt angle sensor assembly 1100. The sensor assembly 1100 may be substantially the same as the sensor assemblies shown in FIGS. 9A, 9B, 10A, and 10B, except a latch 1102 is included. When the sensor 104 is returned to the operating position, the latch may be used to latch the sensor 104 in the operating position. The latch inhibits the sensor assembly 1100 from inadvertently moving from the operating position. The latch may take a wide variety of different forms. The latch may be any arrangement that holds the sensor 104 in the operating position. In the example illustrated by FIG. 11, the latch 1102 includes an arm 1104 that engages a projection 1106.

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof.

The invention claimed is:

1. A method of testing a tilt angle sensor of a vehicle comprising:
    positioning the vehicle in a generally horizontal orientation;
    rotating the tilt angle sensor from an operating position to a test position while the vehicle remains in said generally horizontal position;
    testing the tilt angle sensor.

2. The method of claim 1 wherein testing the tilt angle sensor comprises determining an output signal of the tilt angle sensor while the tilt angle sensor is in the test position and comparing the output signal of the tilt angle sensor to a predetermined test position value.

3. The method of claim 1 wherein the vehicle is positioned in said generally horizontal orientation by placing the vehicle on a horizontal support surface.

4. The method of claim 3 wherein the sensor is rotated a predetermined angle with respect to the support surface from the operating position to the test position.

5. The method of claim 1 further comprising returning the sensor to the operating position.

6. The method of claim 1 further comprising returning the sensor to the operating position and latching the sensor in the operating position.

7. The method of claim 2 further comprising:
    rotating the sensor from the test position to a second test position while the vehicle remains in said generally horizontal position;
    determining an output signal of the tilt angle sensor while the tilt angle sensor is in the second test position;
    comparing the output signal of the tilt angle sensor to a predetermined second test position value.

8. The method of claim 1 wherein the tilt angle sensor is coupled to the vehicle such that the tilt angle sensor pivots about a pivot axis from the operating position to the test position.

9. The method of claim 8 wherein the pivot axis is generally parallel to said support surface.

10. The method of claim 1 further comprising supporting the tilt angle sensor at the test position with a leg that is pivotally connected to the tilt angle sensor.

11. The method of claim 10 further comprising returning the sensor to the operating position and latching the sensor in the operating position and wherein the leg remains connected to the tilt angle sensor when the tilt angle sensor is latched in the operating position.

12. The method of claim 7 further comprising supporting the tilt angle sensor at the test position and at the second test position with a leg that is pivotally connected to the tilt angle sensor.

13. The method of claim 12 further comprising returning the sensor to the operating position and latching the sensor in the operating position and wherein the leg remains connected to the tilt angle sensor when the tilt angle sensor is latched in the operating position.

14. A tilt angle sensor assembly for measuring a tilt angle of a vehicle comprising:
    a base member configured for fixed attachment to the vehicle;
    a tilt sensor coupled to the base member such that the tilt sensor is rotatable with respect to the base unit from an operating position to a test position.

15. The tilt angle sensor assembly of claim 14 further comprising a positioning arrangement for positioning the tilt sensor at the test position.

16. The tilt angle sensor of claim 15 wherein the positioning arrangement comprises a leg that is pivotally connected to the tilt angle sensor.

17. The tilt angle sensor of claim 16 wherein the leg remains connected to the tilt angle sensor when the tilt angle sensor is in the operating position.

18. The tilt angle sensor of claim 15 wherein the positioning arrangement is configured to support the tilt angle sensor at the test position and at a second test position.

19. The tilt angle sensor assembly of claim 14 wherein the tilt sensor is rotated a predetermined angle with respect to the base member from the operating position to the test position.

20. The tilt angle sensor assembly of claim 14 further comprising a latch for latching the tilt sensor in the operating position.

21. The tilt angle sensor assembly of claim 14 wherein the tilt angle sensor is coupled to the base member such that the tilt angle sensor pivots about a pivot axis from the operating position to the test position and wherein said pivot axis is generally parallel to a mounting surface of the base member.

22. The method of claim 21 wherein the pivot axis is parallel to said mounting surface of the base member.

23. A lawnmower comprising:
    a frame;
    an engine supported by the frame;
    a mower deck having a cutting blade that is driven by the engine;
    at least one drive wheel that is driven by the engine;
    a tilt sensor supported by the frame for sensing a tilt angle representing the orientation of the frame with respect to a horizontal level plane, wherein the tilt sensor is configured to provide a signal when the tilt angle exceeds a predetermined angle;
    wherein the tilt sensor is coupled to the frame such that the sensor is rotatable with respect to the frame from an operating position of the sensor to a test position of the sensor while the frame remains in a generally horizontal position, to allow the tilt sensor to be tested without tilting the frame.

24. The lawnmower of claim 23 further comprising a positioning arrangement for positioning the tilt sensor at the test position.

25. The lawnmower of claim 24 wherein the positioning arrangement comprises a leg that is pivotally connected to the tilt angle sensor.

26. The lawnmower of claim 25 wherein the leg remains connected to the tilt angle sensor when the tilt angle sensor is in the operating position.

27. The lawnmower of claim 25 wherein the positioning arrangement is configured to support the tilt angle sensor at the test position and at a second test position.

28. The lawnmower of claim 24 wherein the positioning arrangement is configured to rotate the tilt sensor a predetermined angle with respect to the frame from the operating position to the test position.

29. The lawnmower of claim 23 further comprising a latch for latching the tilt sensor in the operating position.

30. A tilt angle arrangement for measuring a tilt angle of a vehicle comprising:
a securing member configured for fixed attachment to a vehicle;
a tilt sensor having a moveable connection with said securing member allowing for independent movement of said tilt sensor relative to said securing member from an operating position to a test position.

31. The tilt angle arrangement of claim 30 wherein said securing member is fixedly attached to a base member configured for fixed attachment to a vehicle.

32. The tilt angle arrangement of claim 30 wherein said securing member comprises a coupling configured for direct fixed attachment to a vehicle.

33. The tilt angle arrangement of claim 31 wherein said securing member comprises a coupling configured for direct fixed attachment to said base member.

34. The tilt angle arrangement of claim 30 wherein said moveable connection is a rotatable connection between said tilt sensor and said securing member.

35. The tilt angle arrangement of claim 31 wherein said moveable connection is a rotatable connection between said tilt sensor and said securing member.

36. The tilt angle arrangement of claim 32 wherein said moveable connection is a rotatable connection formed by said coupling.

37. The tilt angle arrangement of claim 33 wherein said moveable connection is a rotatable connection formed by said coupling.

38. A method of testing a tilt angle arrangement of a vehicle, the method comprising:
forming a fixed connection between a securing member and a surface of a vehicle;
forming a moveable connection with said securing member and a tilt sensor such that independent movement of said tilt sensor is achieved relative to said securing member from an operating position to a test position.

39. The method of claim 38 wherein said moveable connection is a rotatable connection.

40. The method of claim 38 wherein said forming a fixed connection between said securing member and a surface of a vehicle comprises attaching said securing member to a base member and securing said base member to a surface of a vehicle.

* * * * *